United States Patent
Feng et al.

(10) Patent No.: US 11,326,400 B2
(45) Date of Patent: May 10, 2022

(54) DRILLABLE ADAPTIVE TURBINE GUIDE SHOE

(71) Applicant: YANGTZE UNIVERSITY, Jingzhou (CN)

(72) Inventors: Ding Feng, Jingzhou (CN); Yu Zhao, Jingzhou (CN)

(73) Assignee: YANGTZE UNIVERSITY, Jingzhou (CN)

( * ) Notice: Subject to any disclaimer, the term of this patent is extended or adjusted under 35 U.S.C. 154(b) by 0 days.

(21) Appl. No.: 17/211,893

(22) Filed: Mar. 25, 2021

(65) Prior Publication Data
US 2022/0081973 A1    Mar. 17, 2022

(30) Foreign Application Priority Data

Sep. 15, 2020  (CN) .......................... 2020109660407.7

(51) Int. Cl.
| E21B 7/20 | (2006.01) |
| E21B 17/14 | (2006.01) |
| E21B 4/02 | (2006.01) |
| E21B 7/28 | (2006.01) |
| E21B 4/00 | (2006.01) |

(52) U.S. Cl.
CPC ................. *E21B 7/208* (2013.01); *E21B 4/02* (2013.01); *E21B 7/28* (2013.01); *E21B 17/14* (2013.01); *E21B 4/003* (2013.01)

(58) Field of Classification Search
CPC ............. E21B 7/20; E21B 7/208; E21B 17/14
See application file for complete search history.

(56) References Cited

U.S. PATENT DOCUMENTS 9,506,318 B1 * 11/2016 Brunet .................... E21B 41/00

FOREIGN PATENT DOCUMENTS

| CA | 2775524 A1 | * | 10/2013 | ............. E21B 10/26 |
| CN | 106703716 A | * | 5/2017 | ............. E21B 17/14 |
| CN | 206397450 U | * | 8/2017 | |
| CN | 110130846 A | * | 8/2019 | ........... E21B 29/002 |
| CN | 113006696 A | * | 6/2021 | ............... E21B 7/28 |

* cited by examiner

*Primary Examiner* — Giovanna Wright
(74) *Attorney, Agent, or Firm* — WPAT, PC

(57) ABSTRACT

Disclosed is a drillable adaptive turbine guide shoe, including an adaptive booster component and a power casing shoe component; the adaptive booster component includes a supercharging hollow shaft, a supercharging shell, a disc spring group, a shunt head, a jet oscillator and a semi-cylindrical ring, the supercharging hollow shaft is slidably connected to the supercharging shell, one end of the supercharging hollow shaft is a liquid inlet end and the other end is closed, a cavity is formed between the supercharging hollow shaft and the supercharging shell, and the disc spring group is built in the cavity, the jet oscillator and the semi-cylindrical ring are mounted on the inner wall of the supercharging shell, and one side of the jet oscillator and the semi-cylindrical ring abuts against the shunt head, the shunt head is sleeved on the outer wall of the supercharging hollow shaft; this disclosure solves the problem that the casing cannot be effectively run when the wellbore has sand bridges or wellbore necking.

10 Claims, 5 Drawing Sheets

DRILLABLE ADAPTIVE TURBINE GUIDE SHOE

FIELD OF THE DISCLOSURE

The disclosure relates to drillable adaptive turbine guide shoe.

BACKGROUND

With the development of domestic and foreign oil and gas exploitation towards unconventional and complex wells, highly deviated wells and horizontal wells have become important trends in oil and gas exploitation. The difficulty of horizontal well cementing and completion lies in how the casing runs smoothly into the horizontal well section. In the process of running the casing in the horizontal section, the casing is in contact with the rock on the well wall, and scraping occurs, which easily causes the casing to be blocked and the running is blocked, leading to a running failure. At present, the existing casing guide shoe only functions as a guide tube string, which can solve the conventional running problem. However, when the wellbore has problems such as sand bridges or wellbore necking, the casing cannot be run effectively.

SUMMARY

A technical problem to be solved by the disclosure is to provide a drillable adaptive turbine guide shoe to solve the problem that casing cannot be effectively run when sand bridges or wellbore necking occurs in the wellbore.

A drillable adaptive turbine guide shoe comprising an adaptive booster component and a power casing shoe component;

The adaptive booster component includes a supercharging hollow shaft, a supercharging shell, a disc spring group, a shunt head, a jet oscillator and a semi-cylindrical ring, the supercharging hollow shaft is slidingly connected to the supercharging shell, one end of the supercharging hollow shaft is a liquid inlet end and the other end is closed, a cavity is formed between the supercharging hollow shaft and the supercharging shell, the disc spring group is built in the cavity, and the jet oscillator and the semi-cylindrical ring is attached to the inner wall of the supercharging shell, and one side of the jet oscillator and the semi-cylindrical ring abuts against the shunt head, and the shunt head is sleeved on the outer wall of the supercharging hollow shaft, the shunt head is provided with a first shunt hole communicating with the jet oscillator, and the shunt head is provided with a second shunt hole communicating with the semi-cylindrical ring, the other side of the jet oscillator and the semi-cylindrical ring are in contact with the supercharging shell, when the supercharging shell is subjected to axial compression, the interior of the supercharging hollow shaft is connected to the liquid inlet end of the jet oscillator through the first shunt hole, and the second shunt hole is closed, when the supercharging shell is not subjected to axial compression force, the interior of the supercharging hollow shaft is connected to the interior of the semi-cylindrical ring through the second shunt hole, and the first shunt hole is closed.

The power casing shoe component includes a casing shell, a turbine shaft, a turbine stator, a turbine rotor and a guide shoe, the casing shell is in communication with the outlet end of the jet oscillator or the semi-cylindrical ring, the turbine shaft is built in the casing shell, the turbine shaft is rotationally connected to the casing shell, and the turbine rotor is sleeved on the turbine shaft, the turbine stator is attached to the inner wall of the casing shell, and the turbine stator and the turbine rotor are rotationally connected, a flow channel is formed between the turbine stator and the turbine rotor, the liquid inlet end of the flow channel communicates with the liquid outlet end of the supercharging shell, and the liquid outlet end of the flow channel is connected to the inside of the guide shoe, the guide shoe is connected to the turbine shaft at the end away from the supercharging shell.

By setting the adaptive booster component, which comprises supercharging hollow shaft, supercharging shell, disc spring group, shunt head, jet oscillator, and semi-cylindrical ring, in the process of tool running, when there is too much resistance, the first shunt hole and the supercharging hollow shaft is internally connected, and drilling fluid is introduced into the jet oscillator to generate axial impulse force, which can assist in expanding the drilling hole and running the power casing shoe component; At the same time, by setting the power casing shoe component, which includes the casing shell, the turbine shaft, the turbine stator, the turbine rotor, and the guide shoe, the drilling fluid enters the gap between the turbine stator and the turbine rotor, and impacts the turbine rotor to drive the turbine rotor to rotate, and provides torque to the guide shoe, which drives the guide shoe on the turbine shaft to rotate and realizes the drilling work. When the guide shoe is subjected to excessive friction, the speed of the turbine shaft decreases, and the torque of the turbine shaft increases, which is suitable for the working environment where the guide shoe needs high torque; therefore, the torque applied by the turbine shaft to the guide shoe can be adaptively changed with the friction force received by the guide shoe, which can effectively solve the problems of necking and sand bridges.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Embodiment is provided below to further explain the method provided by this disclosure.

Figure 1:
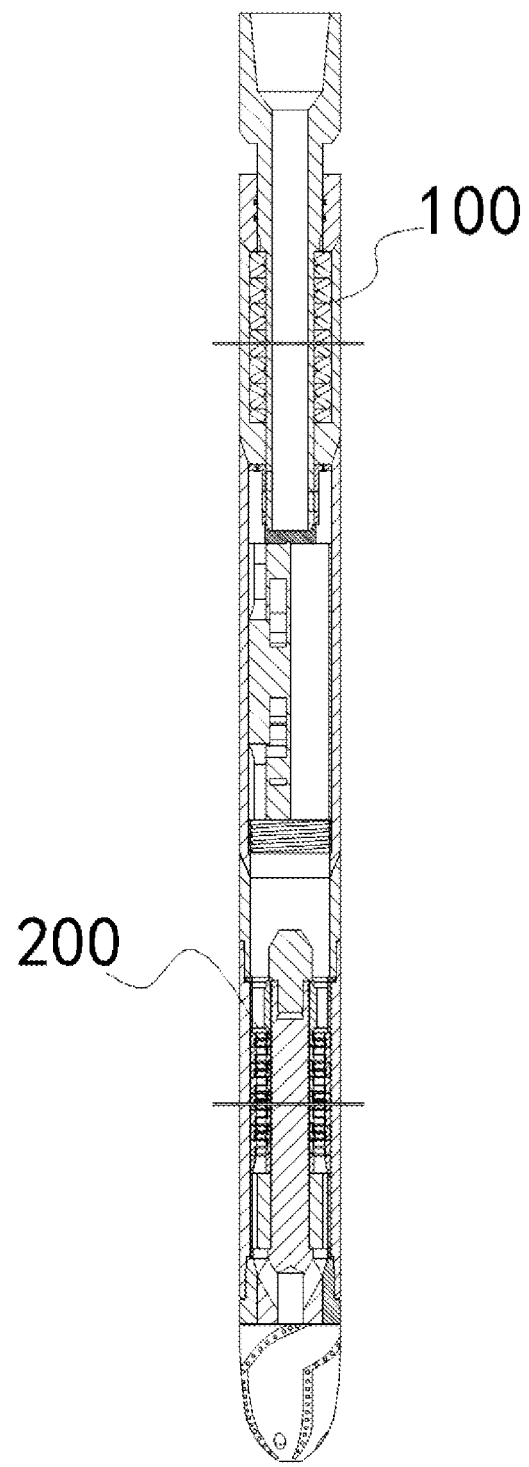
FIG. 1 is a schematic diagram of the overall structure of an embodiment of the drillable adaptive turbine guide shoe provided by this disclosure.

As shown in FIG. 1, a drillable adaptive turbine guide shoe provided by this disclosure includes an adaptive booster component 100 and a power casing shoe component 200. The inlet end of the adaptive booster component 100 is connected to the drilling fluid, and the outlet end of the adaptive booster component 100 is connected to the power casing shoe. The liquid inlet of the component 200 is connected, and the power casing shoe component 200 has a liquid outlet. At the same time, the adaptive booster component 100 is connected with the power casing shoe component 200.

The adaptive booster component 100 in this embodiment includes a supercharging hollow shaft 110, a supercharging shell 120, a disc spring group 130, a shunt head 140, a jet oscillator 160, and a semi-cylindrical ring 170. The supercharging hollow shaft 110 is slidingly connected to the supercharging shell 120, and one end of the supercharging hollow shaft 110 is liquid inlet, and the other end is closed. A cavity is formed between the supercharging hollow shaft 110 and the supercharging shell 120. The disc spring group 130 is built into the cavity. One side of the jet oscillator 160 and the semi-cylindrical ring 170 abuts against the shunt head 140, and the shunt head 140 is sleeved on the outer wall of the supercharging hollow shaft 110, the shunt head 140 is provided with a first shunt hole 141 connected to the jet oscillator 160, and the shunt head 140 is provided with a second shunt hole 142 connected to the semi-cylindrical ring 170. The other side of the jet oscillator 160 and the semi-cylindrical ring 170 are in contact with the supercharging shell 120. When the supercharging shell 120 is subjected to axial compression, the interior of the supercharging hollow shaft 110 is connected to the liquid inlet end of the jet oscillator 160 through the first shunt hole 141, and the second shunt hole 142 is closed. When the supercharging shell 120 is not subjected to axial compression, the interior of the supercharging hollow shaft 110 is connected to the interior of the semi-cylindrical ring 170 through the second shunt hole 142, and the first shunt hole 141 is closed.

Among them, the supercharging shell 120 has a cavity inside, which is convenient for placing the supercharging hollow shaft 110, the disc spring group 130, the shunt head 140, the jet oscillator 160, the semi-cylindrical ring 170 and a spring 180, and at the same time facilitates the introduction of drilling fluid into the cavity, along with the direction of the liquid, the supercharging hollow shaft 110, the disc spring group 130, the shunt head 140, (the jet oscillator 160 and the semi-cylindrical ring 170), and the spring 180 are arranged in sequence.

As shown in FIG. 2, FIG. 3, FIG. 5 and FIG. 6, the supercharging shell 120 in this embodiment includes a baffle ring 121, a moving sleeve 122 and a moving shell 123, the baffle ring 121 is sleeved on the supercharging hollow shaft 110, the baffle ring 121 is slidingly connected to the supercharging hollow shaft 110, the baffle ring 121 is threaded to one end of the moving sleeve 122, and the other end of the moving sleeve 122 is threaded to the moving shell 123. The disc spring group 130 is built into the moving sleeve 122. One end of the disc spring group 130 abuts against the shoulder of the supercharging hollow shaft 110 and the baffle ring 121, the other end of the disc spring group 130 abuts against the shoulder of the moving sleeve 122, the shunt head 140 is fixed to the supercharging hollow shaft 110 by screws, and the shunt hole is connected with the interior of the supercharging hollow shaft 110. The jet oscillator 160 and semi-cylindrical ring 170 are both attached to the inner wall of the moving shell 123.

Among them, the supercharging hollow shaft 110 is a hollow shaft, the end of the supercharging hollow shaft 110 away from the moving sleeve 122 is a liquid inlet end, and the connections between the supercharging hollow shaft 110, the baffle ring 121, the moving sleeve 122 and the moving shell 123 are all threaded connections.

Figure 2:
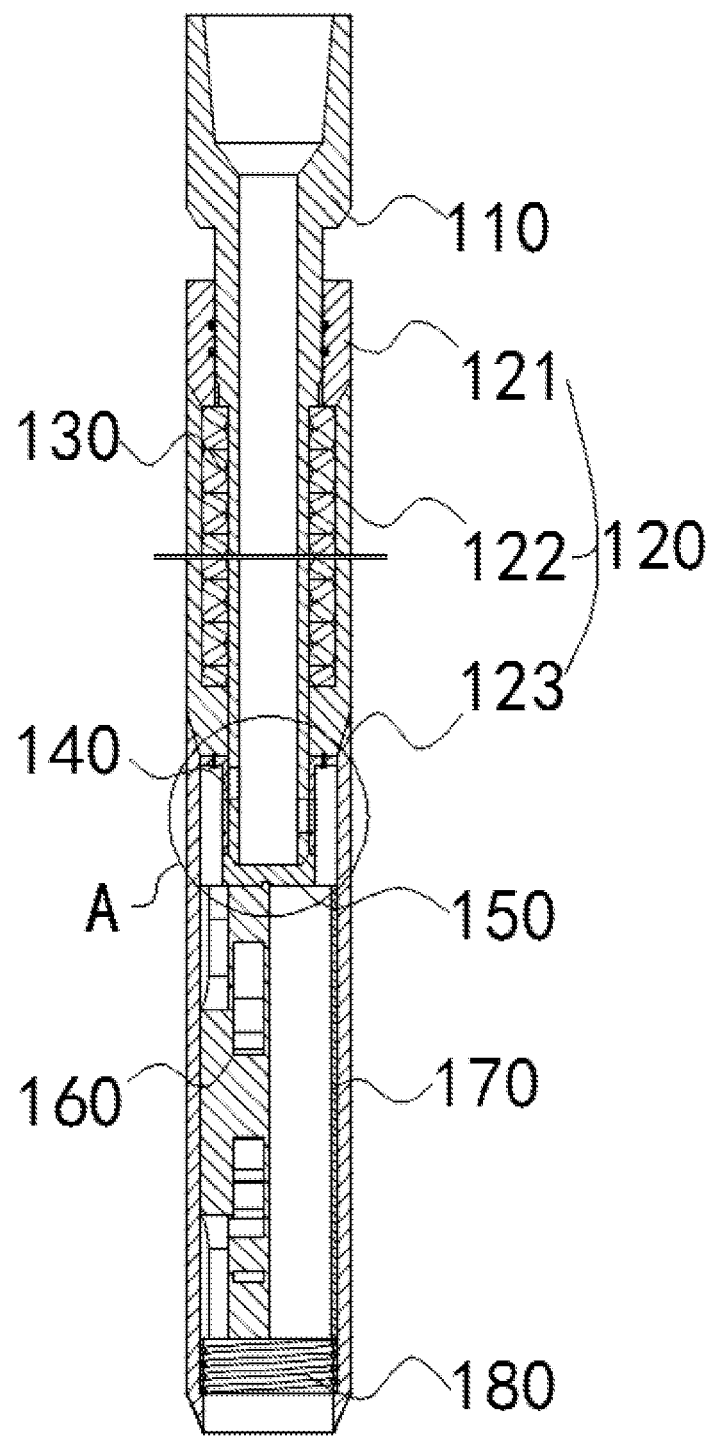
FIG. 2 is a schematic structural diagram of the adaptive booster component of an embodiment of the drillable adaptive turbine guide shoe provided by this disclosure.
Figure 3:
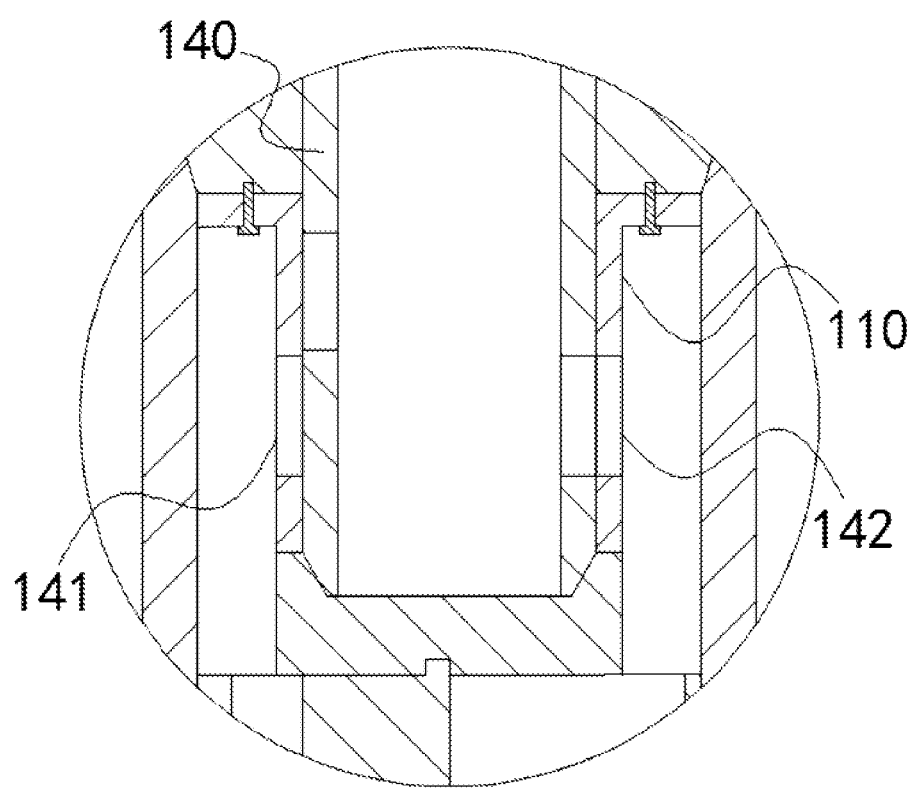
FIG. 3 is the enlarged schematic diagram of area A in FIG. 2.

The flow path of the drilling fluid is as follows, as shown in FIG. 2 and FIG. 3, the drilling fluid enters the moving sleeve 122 through the supercharging hollow shaft 110, and is introduced into the semi-cylindrical ring 170 through the second shunt hole 142 on the shunt head 140. Specifically, the drilling fluid is introduced into the cavity formed between jet oscillator 160 and semi-cylindrical ring 170, and introduced into the power casing shoe component 200 through the cavity. When the supercharging shell 120 is under pressure, the supercharging hollow shaft 110 slides in the axial direction relative to the supercharging shell 120, thereby squeezing the disc spring group 130 to deform, and the supercharging hollow shaft 110 slides relative to the shunt head 140 until the first shunt hole 141 on the shunt head 140 is connected with the interior of the supercharging hollow shaft 110. The diversion hole introduces the drilling fluid in the supercharging hollow shaft 110 into the jet oscillator 160.

Specifically, two through holes corresponding to the first shunt hole 141 and the second shunt hole 142 are opened on both sides of the supercharging hollow shaft 110. When the supercharging shell 120 is not under pressure, the second shunt hole 142 is connected to one of the through holes. At this time, the cavity formed between the concave surface of the cylindrical ring 170 and the jet oscillator 160 is connected to the interior of the supercharging hollow shaft 110; when the supercharging shell 120 is under pressure, the first shunt hole 141 is connected to another through hole. At this time, the liquid inlet end of the jet oscillator 160 is connected to the interior of the supercharging hollow shaft 110.

Figure 5:
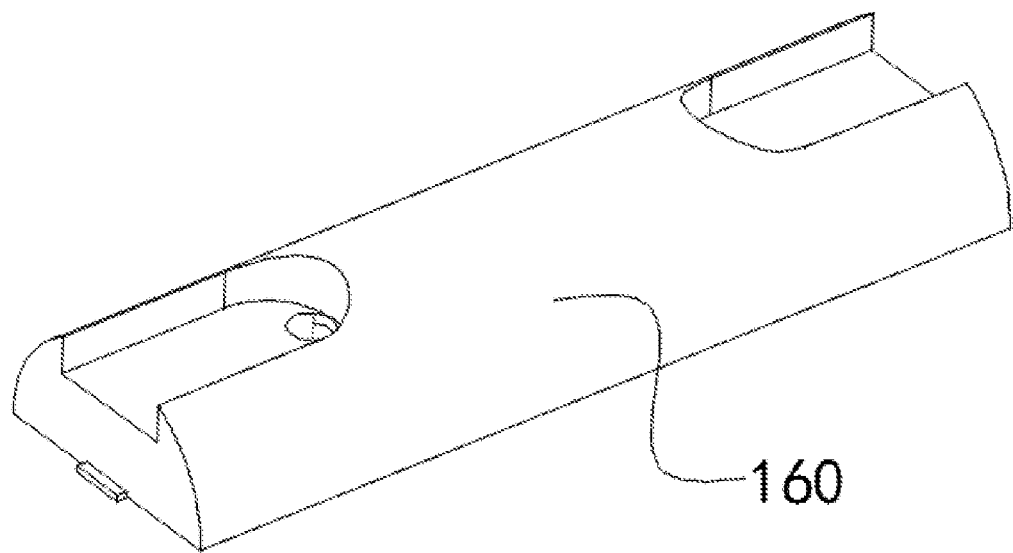
FIG. 5 is a schematic structural diagram of the jet oscillator in an embodiment of the drillable adaptive turbine guide shoe provided by this disclosure.
Figure 6:
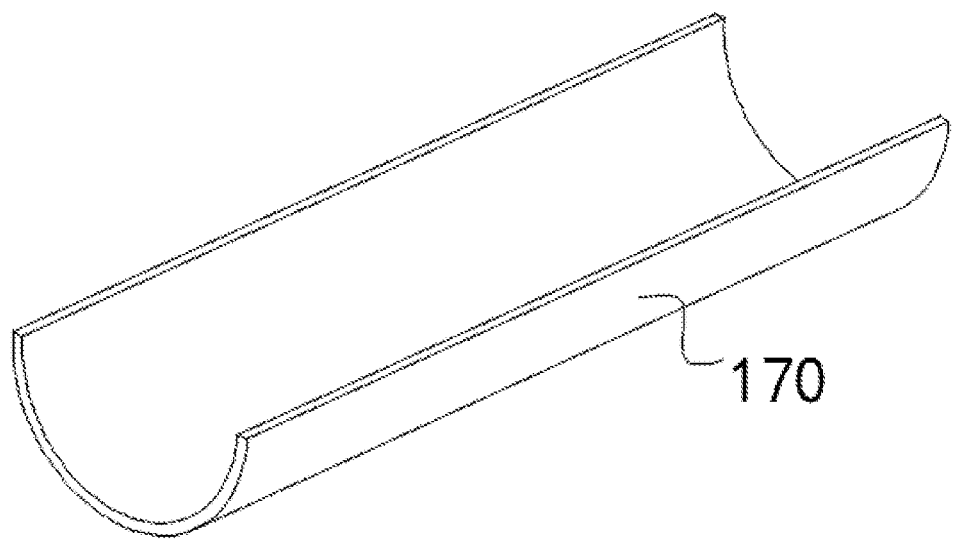
FIG. 6 is a schematic structural diagram of the semi-cylindrical ring in an embodiment of the drillable adaptive turbine guide shoe provided by this disclosure.

As shown in FIG. 5, the specific structure and working principle of the jet oscillator 160 in this embodiment are the same as the article number: 1005-0329 (2018) 09-0013-05 Volume 46, Issue 9 with the title of principle and experimental research of a new type of jet oscillator published in September 2018.

In order to make the motions of the supercharging hollow shaft 110, shunt head 140, jet oscillator 160 and semi-cylindrical ring 170 more stable, the two through holes on the supercharging hollow shaft 110 are misaligned with the first shunt hole 141 and the second shunt hole 142, and they are not connected. In this embodiment, the adaptive booster component 100 also includes a fixed cover 150, one end of the fixed cover 150 abuts against the shunt head 140, and the other end of the fixed cover 150 abuts against the jet oscillator 160 and the semi-cylindrical ring 170.

In order to prevent the jet oscillator 160 and the semi-cylindrical ring 170 from rotating in the circumferential direction, the adaptive booster component 100 in this embodiment further includes the spring 180. One end of the spring 180 is fixedly connected to the jet oscillator 160 and the semi-cylindrical ring 170, and the other end of the spring 180 abuts against the inner wall of the supercharging shell 120.

It is understandable that other forms of structures can also be used to limit the circumferential rotation of the jet oscillator 160 and the semi-cylindrical ring 170.

In this embodiment, the inlet end of the power casing shoe component 200 is connected with the outlet end of the jet oscillator 160 or the outlet end of the semi-cylindrical ring 170 to generate drilling power, which will be described in more detail below.

Figure 4:
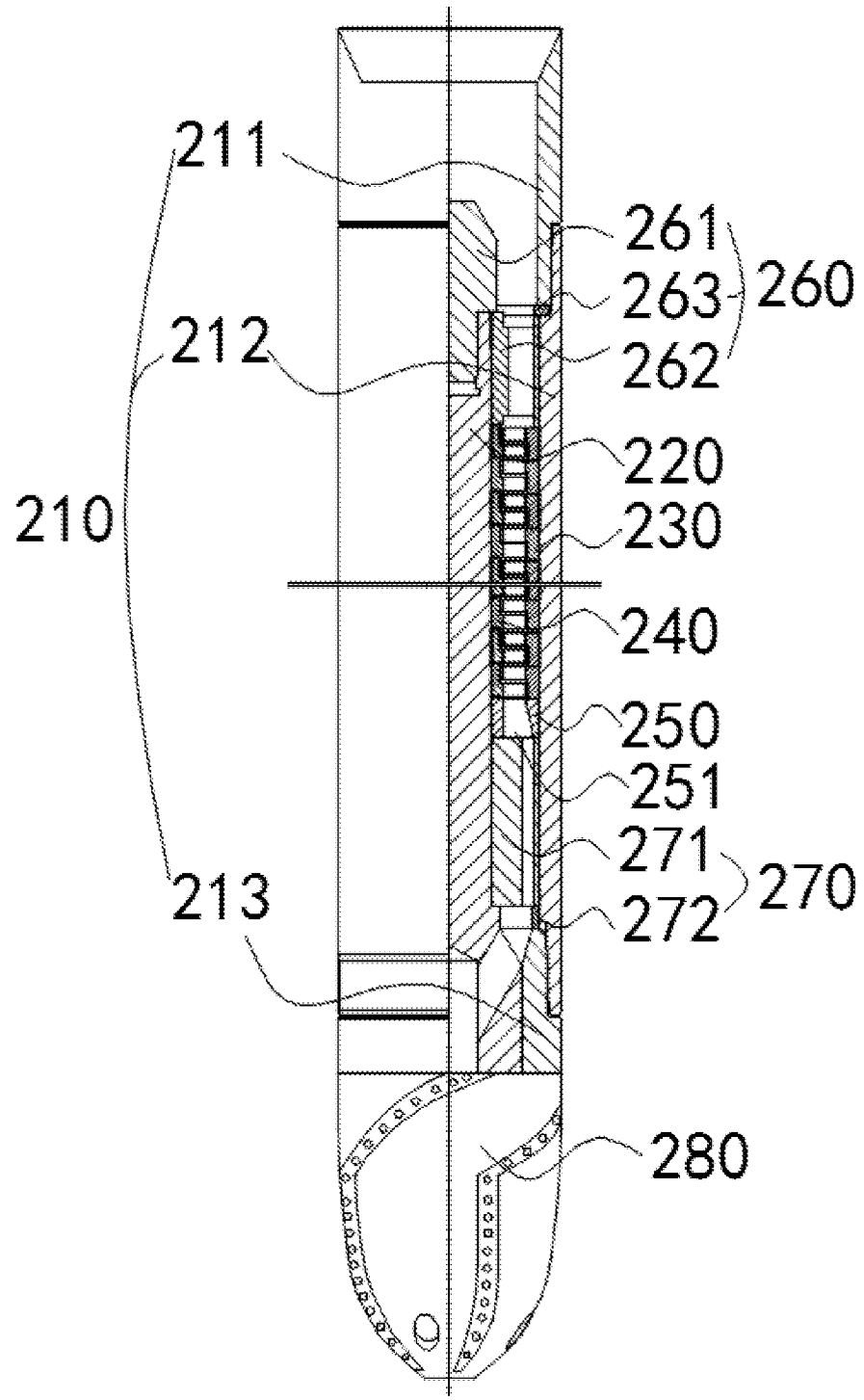
FIG. 4 is a schematic structural diagram of the power casing shoe component of an embodiment of the drillable adaptive turbine guide shoe provided by this disclosure.

As shown in FIG. 4, the power casing shoe component 200 in this embodiment includes a casing shell 210, a turbine shaft 220, a turbine stator 230, a turbine rotor 240, and a guide shoe 280. The casing shell 210 is in communication with the outlet end of the jet oscillator 160 or the semi-cylindrical ring 170, and the turbine shaft 220 is in the casing shell 210, the turbine shaft 220 is rotatably connected with the casing shell 210, the turbine rotor 240 is sleeved on the turbine shaft 220, the turbine stator 230 is attached to the inner wall of the casing shell 210, and the turbine stator 230 and the turbine rotor 240 are rotationally connected, and a flow channel is formed between the turbine stator 230 and the turbine rotor 240, the inlet end of the flow channel is connected with the outlet end of the supercharging shell 120, the outlet end of the flow channel is connected with the inside of the guide shoe 280, and the guide shoe 280 is connected with the turbine shaft 220 away from the end of the supercharging shell 120.

The casing shell 210 in this embodiment includes a casing joint 211, a casing body 212 and an end cover 213. One end of the casing joint 211 is threadedly connected to the supercharging shell 120, the other end of the casing joint 211 is threaded to one end of the casing body 212, the other end of the casing body 212 is threaded to the end cover 213, the casing body 212 is cylindrical, the turbine shaft 220 is rotatably connected to the casing body 212, and the turbine stator 230 is attached to the inner wall of the casing body 212, and the shoulder of the casing joint 211 on the opposite side and the end cover 213 abuts against the turbine stator 230.

Among them, the casing joint 211 has a cylindrical shape, one end of which is threadedly connected to the end of the moving shell 123 away from the moving sleeve, and the other end is threadedly connected to the casing body 212.

Among them, the casing body 212 plays a role of fixing the turbine stator 230, one end of the casing body 212 is screwed to the casing joint 211, and the other end of the casing body 212 is connected to the end cover 213.

Among them, the end cover 213 has a cylindrical shape and cooperates with the casing joint 211 to fix the two ends of the turbine stator 230 so as to prevent relative movement between the turbine stator 230 and the casing body 212.

In this embodiment, the turbine shaft 220 is connected to the turbine stator 230, the turbine shaft 220 is rotatably connected to the casing body 212, and the turbine stator 230 and the turbine rotor 240 are used together. Specifically, the drilling fluid enters the gap between the turbine stator 230 and the turbine rotor 240, and during the process of the drilling fluid flowing along the gap, the turbine stator 230 is impacted, and the turbine rotor 240 rotates around the turbine stator 230. At the same time, the turbine rotor 240 drives the turbine shaft 220 to rotate, thereby driving the guide shoe 280 that connected to the turbine rotor 240 to rotate, and the guide shoe 280 rotates to realize the drilling operation.

In order to achieve the drainage effect, that is, to guide the drilling fluid in the gap between the turbine stator 230 and the turbine rotor 240 into the guide shoe 280. In this embodiment, the turbine stator 230 and the end cover 213 are connected by a flow deflector 250. One end of the flow deflector 250 abuts against the turbine stator 230, and the other end of the flow deflector 250 abuts against the end cover 213. The flow deflector 250 is provided with a deflector hole 251, the gap between the turbine stator 230 and the turbine rotor 240 is communicated with the guide shoe 280 via the deflector hole 251.

In order to make the motions of the turbine shaft 220, the turbine stator 230 and the turbine rotor 240 more stable, the power casing shoe component 200 in this embodiment further includes a first limiting member 260. The first limiting member 260 includes a fixed shaft shoulder 261, a centralizing bearing 262, and a first limiting sleeve 263, the fixed shaft shoulder 261 is sleeved on the turbine shaft 220, the fixed shaft shoulder 261 abuts on one end of the turbine rotor 240 near the supercharging shell 120, and the centralizing bearing 262 is sleeved on the turbine shaft 220 to centralize the turbine shaft 220. The first limiting sleeve 263 is fixed on the inner wall of the casing shell 210, and the first limiting sleeve 263 abuts against one end of the turbine stator 230 close to the supercharging shell 120.

Furthermore, the power casing shoe component 200 further includes a second limiting member 270, the second limiting member 270 includes a thrust bearing 271 and a second limiting sleeve 272, the thrust bearing 271 is sleeved on the turbine shaft 220, the thrust bearing 271 abuts against the turbine rotor 240 at the end away from the supercharging shell 120 to balance the axial force of the turbine shaft 220. The second limiting sleeve 272 is fixed on the inner wall of the casing shell 210, and the second limiting sleeve 272 abuts on the end of the turbine stator 230 away from the supercharging shell 120.

In summary, the combined use of the first limiting member 260 and the second limiting member 270 prevents axial movement between the turbine shaft 220, the turbine stator 230, and the turbine rotor 240 and the casing shell 210.

In order to make the drilling process smoother, metal teeth are fixedly connected to the outer wall of the guide shoe 280 in this embodiment.

Furthermore, the outer wall of the guide shoe 280 is provided with multiple sets of side flow holes communicating with the inside of the guide shoe 280. The multiple sets of side flow holes are evenly arranged along the circumference of the guide shoe 280. Each set of side flow holes includes multiple side flow holes. The flow holes are arranged in sequence along the length of the guide shoe 280.

Work flow: running the tool and adding drilling fluid to the supercharging hollow shaft 110 at the same time. The drilling fluid is passed through the cavity between the supercharging hollow shaft 110, the second shunt hole 142, the semi-cylindrical ring 170 and the jet oscillator 160, and finally imported into the casing shell 210 for drilling. The drilling fluid flows into the gap between the turbine stator 230 and the turbine rotor 240. The drilling fluid impacts the turbine rotor 240 and drives the turbine rotor 240 to rotate, thereby driving the turbine shaft 220 to rotate. The turbine shaft 220 applies a torque to the guide shoe 280 to make the guide shoe 280 rotate with the turbine shaft 220. The guide shoe 280 has metal teeth on the outer wall and side flow holes to make the mud spray effect. The kinetic energy of the fluid is used to impact the sand bridge, thereby repairing the well wall, expanding the wellbore, and making the wellbore more regular. The flow rate of the drilling fluid in the casing shell 210 is constant. When the guide shoe 280 receives resistance, the speed of the guide shoe 280 slows down, and the speed of the turbine rotor 240 slows down. The flow rate of drilling fluid flowing through the gap between the turbine rotor 240 and the turbine stator 230 is reduced, and the pressure of the drilling fluid in the casing shell 210 increases, which increases the torque received by the guide shoe 280, overcomes the friction force, and can adaptively adjust the torque to a certain extent.

At the same time, when the supercharging shell 120 receives circumferential resistance, relative movement occurs between the supercharging shell 120 and the supercharging hollow shaft 110, squeezing the disc spring group 130 to deform it, and the jet oscillator 160 communicates with the interior of the supercharging hollow shaft 110 through the first shunt hole 141. The liquid enters the jet oscillator 160, and the jet oscillator 160 generates a pulse force along the axis of the supercharging hollow shaft 110 to assist expanding the drilling hole and running the power casing shoe component 200.

Compared with the Prior Art (1) When the drilling fluid passes through the turbine (turbine shaft 220, turbine stator 230, and turbine rotor 240) inside the tool, the turbine shaft 220 rotates at a high speed, driving the guide shoe 280 at the bottom to rotate, which only has a small impact on the pressure drop, and the vibration amplitude is small, which can meet the requirements of the downloading of precision liner completion;

(2) The number of turbine stages and the number of bearings (thrust bearing 271 and centralizing bearing 262) can be flexibly adjusted according to site requirements to provide different working torques;

(3) The tool is installed at the bottom of the casing, and the guide shoe 280 at the bottom is driven to rotate by the inner turbine. There are metal teeth on the outer surface of the casing and side flow holes to make the mud spray effect. The kinetic energy of the drilling fluid is used to impact the sand bridge to repair the well wall, expand the wellbore, and make the wellbore more stable. The casing can be smoothly run to the bottom of the well without rotating the casing, which avoids repeated drilling operations and can save operating time;

(4) When the tool encounters resistance during the running process, the turbine speed will decrease due to frictional resistance during the cutting of the casing. Under the condition of a certain flow rate, the turbine speed will decrease and the torque will increase. Therefore, with the turbine as the driving force, the torque can be adjusted adaptively to a certain extent;

(5) When the tool encounters too much resistance during the running process, the adaptive booster component 100 in the tool will generate axial pulse force to assist the expanding of the wellbore and the running of the casing, which greatly improves the casing running efficiency;

(6) The inner shaft core parts of the tool are made of drillable materials, which will not affect the next drilling operation. After drilling, the shell can be left as a part of the casing to continue to use.

In summary, by setting the adaptive booster component 100, which comprises the supercharging hollow shaft 110, the supercharging shell 120, the disc spring group 130, the shunt head 140, the jet oscillator 160 and the semi-cylindrical ring 170, in the process of tool running, when there is too much resistance, the first shunt hole 141 and the supercharging hollow shaft 110 is internally connected, and the drilling fluid is introduced into the jet oscillator 160 to generate axial impulse force, which can assist in expanding the drilling hole and running the power casing shoe component 200; at the same time, by setting the power casing shoe component 200, which includes the casing shell 210, the turbine shaft 220, the turbine stator 230, the turbine rotor 240, and the guide shoe 280, the drilling fluid enters the gap between the turbine stator 230 and the turbine rotor 240, and impacts the turbine rotor 240 to drive the turbine rotor 240 to rotate, and provides torque to the guide shoe 280, which drives the guide shoe 280 on the turbine shaft 220 to rotates to realize the drilling work. When the guide shoe 280 is subjected to excessive friction, the speed of the turbine shaft 220 will decrease, and the torque of the turbine shaft 220 will increase, which is suitable for the working environment where the guide shoe 280 needs high torque; therefore, the torque applied by the turbine shaft 220 to the guide shoe 280 can be adaptively changed with the friction force received by the guide shoe 280, which can effectively solve the problems of necking and sand bridges.

It is to be understood, however, that even though numerous characteristics and advantages of this disclosure have been set forth in the foregoing description, the disclosure is illustrative only, and changes may be made in detail, especially in matters of shape, size, and arrangement of parts within the principles of this disclosure to the full extent indicated by the broad general meaning of the terms in which the appended claims are expressed.

What is claimed is:

1. A drillable adaptive turbine guide shoe comprising an adaptive booster component and a power casing shoe component, wherein:

the adaptive booster component includes a supercharging hollow shaft, a supercharging shell, a disc spring group, a shunt head, a jet oscillator and a semi-cylindrical ring, the supercharging hollow shaft is slidingly connected to the supercharging shell, one end of the supercharging hollow shaft is a liquid inlet end and the other end is closed, a cavity is formed between the supercharging hollow shaft and the supercharging shell, the disc spring group is built in the cavity, and the jet oscillator and the semi-cylindrical ring is attached to the inner wall of the supercharging shell, and one side of the jet oscillator and the semi-cylindrical ring abuts against the shunt head, and the shunt head is sleeved on the outer wall of the supercharging hollow shaft, the shunt head is provided with a first shunt hole communicating with the jet oscillator, and the shunt head is provided with a second shunt hole communicating with the semi-cylindrical ring, the other side of the jet oscillator and the semi-cylindrical ring are in contact with the supercharging shell, when the supercharging shell is subjected to axial compression, the interior of the supercharging hollow shaft is connected to the liquid inlet end of the jet oscillator through the first shunt hole, and the second shunt hole is closed, when the supercharging shell is not subjected to axial compression force, the interior of the supercharging hollow shaft is connected to the interior of the semi-cylindrical ring through the second shunt hole, and the first shunt hole is closed;

the power casing shoe component includes a casing shell, a turbine shaft, a turbine stator, a turbine rotor and a guide shoe, the casing shell is in communication with the outlet end of the jet oscillator or the semi-cylindrical ring, the turbine shaft is built in the casing shell, the turbine shaft is rotationally connected to the casing shell, and the turbine rotor is sleeved on the turbine shaft, the turbine stator is attached to the inner wall of the casing shell, and the turbine stator and the turbine rotor are rotationally connected, a flow channel is formed between the turbine stator and the turbine rotor, the liquid inlet end of the flow channel communicates with the liquid outlet end of the supercharging shell, and the liquid outlet end of the flow channel is connected to the inside of the guide shoe, the guide shoe is connected to the turbine shaft at the end away from the supercharging shell.

2. The drillable adaptive turbine guide shoe according to claim 1, wherein the supercharging shell includes a baffle ring, a moving sleeve and a moving shell, the baffle ring is sleeved on the supercharging hollow shaft, the baffle ring is slidingly connected to the supercharging hollow shaft, the baffle ring is threaded to one end of the moving sleeve, and the other end of the moving sleeve is threaded to the moving shell, the disc spring group is built into the moving sleeve, one end of the disc spring group abuts against the shoulder of the supercharging hollow shaft and the baffle ring, the other end of the disc spring group abuts against the shoulder of the moving sleeve, the shunt head is fixed to the supercharging hollow shaft by screws, and the shunt hole is connected with the interior of the supercharging hollow shaft, the jet oscillator and semi-cylindrical ring are both attached to the inner wall of the moving shell.

3. The drillable adaptive turbine guide shoe according to claim 1, wherein the adaptive booster component also includes a fixed cover, one end of the fixed cover abuts against the shunt head, and the other end of the fixed cover abuts against the jet oscillator and the semi-cylindrical ring.

4. The drillable adaptive turbine guide shoe according to claim 1, wherein the adaptive booster component further includes a spring, one end of the spring is fixedly connected to the jet oscillator and the semi-cylindrical ring, and the other end of the spring abuts against the inner wall of the supercharging shell.

5. The drillable adaptive turbine guide shoe according to claim 1, wherein the casing shell in this embodiment includes a casing joint, a casing body and an end cover, one end of the casing joint is threadedly connected to the supercharging shell, the other end of the casing joint is threaded to one end of the casing body, the other end of the casing body is threaded to the end cover, the casing body is cylindrical, the turbine shaft is rotatably connected to the casing body, and the turbine stator is attached to the inner wall of the casing body, and the shoulder of the casing joint on the opposite side and the end cover abuts against the turbine stator.

6. The drillable adaptive turbine guide shoe according to claim 5, wherein the turbine stator and the end cover are connected by a flow deflector, one end of the flow deflector abuts against the turbine stator, and the other end of the flow deflector abuts against the end cover, the flow deflector is provided with a deflector hole, the gap between the turbine stator and the turbine rotor is communicated with the guide shoe via the deflector hole.

7. The drillable adaptive turbine guide shoe according to claim 1, wherein the power casing shoe component further includes a first limiting member, the first limiting member includes a fixed shaft shoulder, a centralizing bearing, and a first limiting sleeve, the fixed shaft shoulder is sleeved on the turbine shaft, the fixed shaft shoulder abuts on one end of the turbine rotor near the supercharging shell, and the centralizing bearing is sleeved on the turbine shaft to centralize the turbine shaft, the first limiting sleeve is fixed on the inner wall of the casing shell, and the first limiting sleeve abuts against one end of the turbine stator close to the supercharging shell.

8. The drillable adaptive turbine guide shoe according to claim 1, wherein the power casing shoe component includes a second limiting member, the second limiting member includes a thrust bearing and a second limiting sleeve, the thrust bearing is sleeved on the turbine shaft, the thrust bearing abuts against the turbine rotor at the end away from the supercharging shell, the second limiting sleeve is fixed on the inner wall of the casing shell, and the second limiting sleeve abuts on the end of the turbine stator away from the supercharging shell.

9. The drillable adaptive turbine guide shoe according to claim 1, wherein metal teeth are fixedly connected to the outer wall of the guide shoe.

10. The drillable adaptive turbine guide shoe according to claim 1, wherein the outer wall of the guide shoe is provided with multiple sets of side flow holes communicating with the inside of the guide shoe, the multiple sets of side flow holes are evenly arranged along the circumference of the guide shoe, each set of side flow holes includes multiple side flow holes, the flow holes are arranged in sequence along the length of the guide shoe.

* * * * *